(12) United States Patent
Mizutani et al.

(10) Patent No.: US 10,417,885 B2
(45) Date of Patent: Sep. 17, 2019

(54) SURVEILLANCE POSITION DETERMINING APPARATUS, SURVEILLANCE POSITION DETERMINING METHOD, AND COMPUTER-READABLE MEDIUM

(71) Applicant: SUBARU CORPORATION, Tokyo (JP)

(72) Inventors: Takuma Mizutani, Tokyo (JP); Yasuhiko Yanase, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 92 days.

(21) Appl. No.: 15/440,488

(22) Filed: Feb. 23, 2017

(65) Prior Publication Data

US 2017/0323541 A1 Nov. 9, 2017

(30) Foreign Application Priority Data

Mar. 24, 2016 (JP) ................. 2016-059769

(51) Int. Cl.
| | |
|---|---|
| *G08B 13/196* | (2006.01) |
| *G01C 11/02* | (2006.01) |
| *G05D 1/00* | (2006.01) |
| *G08G 5/00* | (2006.01) |
| *G05D 1/02* | (2006.01) |

(52) U.S. Cl.
CPC ........ *G08B 13/19621* (2013.01); *G01C 11/02* (2013.01); *G05D 1/0077* (2013.01); *G08B 13/1963* (2013.01); *G08G 5/0039* (2013.01); *G05D 1/0202* (2013.01)

(58) Field of Classification Search
CPC ........ G01C 11/02; G01C 7/02; G08G 5/0086; F41G 9/002
See application file for complete search history.

(56) References Cited

U.S. PATENT DOCUMENTS

| | | | | |
|---|---|---|---|---|
| 9,026,272 | B2* | 5/2015 | Kokkeby | G01S 3/7864 701/3 |
| 2008/0133190 | A1* | 6/2008 | Peretz | G06Q 10/043 703/6 |
| 2017/0199039 | A1* | 7/2017 | Kreienheder | G05D 1/0094 |

FOREIGN PATENT DOCUMENTS

| | | |
|---|---|---|
| JP | 2005-528280 A | 9/2005 |
| JP | 4302625 B2 | 7/2009 |
| WO | 03/102505 A1 | 12/2003 |

* cited by examiner

*Primary Examiner* — Francis Geroleo
*Assistant Examiner* — Christopher Kingsbury Glover
(74) *Attorney, Agent, or Firm* — McDermott Will & Emery LLP

(57) ABSTRACT

A surveillance position determining apparatus includes a memory, a cell divider, a score determiner, and a surveillance position setter. The memory stores map information including at least a predetermined surveillance target region. The cell divider divides the map information stored in the memory into multiple cells in a grid on a horizontal plane. The score determiner determines scores for respective candidate cells among the multiple cells. The scores are each based on easiness of viewing from an own aircraft and difficulty of being viewed from a surveillance target that are quantified. The candidate cells exclude multiple surveillance target cells included at least in the surveillance target region. The surveillance position setter sets surveillance positions on a basis of the respective scores of the candidate cells determined by the score determiner.

12 Claims, 8 Drawing Sheets

FIG. 2A

| FOV SUITABILITY VALUE | |
|---|---|
| PERIPHERAL VIEWING ANGLE β | SCORE |
| 180° < β ≤ 360° | 6 |
| 90° < β ≤ 180° | 5 |
| 45° < β ≤ 90° | 4 |
| 30° < β ≤ 45° | 3 |
| 15° < β ≤ 30° | 2 |
| 0° ≤ β ≤ 15° | 1 |

| DIP SUITABILITY VALUE | |
|---|---|
| DIP OF AIRCRAFT BODY | SCORE |
| WITHIN DIP LIMIT VALUE | 4 |
| OUTSIDE DIP LIMIT VALUE; ALTITUDE DIFFERENCE ΔFT WITH RESPECT TO DIP LIMIT VALUE RANGE IS: 0ft ≤ ΔFT < 10ft | 3 |
| OUTSIDE DIP LIMIT VALUE; ALTITUDE DIFFERENCE ΔFT WITH RESPECT TO DIP LIMIT VALUE RANGE IS: 10ft ≤ ΔFT < 30ft | 2 |
| OUTSIDE DIP LIMIT VALUE; ALTITUDE DIFFERENCE ΔFT WITH RESPECT TO DIP LIMIT VALUE RANGE IS: 30ft ≤ ΔFT | 1 |

| TERRAIN SUITABILITY VALUE | |
|---|---|
| TERRAIN | SCORE |
| COAST REGION, RIVER REGION, LAKE REGION, MARSH REGION | 5 |
| WILDLAND | 4 |
| RICE FIELD, FIELD, ORCHARD, MULBERRY FIELD, TEA PLANTATION | 3 |
| FOREST | 2 |
| DENSELY BUILT-UP REGION | 1 |

FIG. 3A

| BACKGROUND SUITABILITY VALUE | |
|---|---|
| BACKGROUND | SCORE |
| PRESENCE | 2 |
| ABSENCE | 1 |

| DISTANCE SUITABILITY VALUE A | |
|---|---|
| HORIZONTAL DISTANCE L | SCORE |
| 5,200m < L | 6 |
| 1,000m < L ≤ 5,200m | 5 |
| 500m < L ≤ 1,000m | 4 |
| 300m < L ≤ 500m | 3 |
| 50m < L ≤ 300m | 2 |
| 0m ≤ L ≤ 50m | 1 |

| DISTANCE SUITABILITY VALUE B | |
|---|---|
| HORIZONTAL DISTANCE L | SCORE |
| 5,200m < L | 11 |
| 3,500m ≤ L ≤ 5,200m | 10 |
| 1,000m < L < 3,500m | 9 |
| 700m ≤ L ≤ 1,000m | 8 |
| 500m < L < 700m | 7 |
| 350m ≤ L ≤ 500m | 6 |
| 300m < L < 350m | 5 |
| 200m < L ≤ 300m | 4 |
| 50m < L ≤ 200m | 3 |
| 34m ≤ L ≤ 50m | 2 |
| 0m ≤ L < 34m | 1 |

← 156f

SURVEILLANCE POSITION DETERMINING APPARATUS, SURVEILLANCE POSITION DETERMINING METHOD, AND COMPUTER-READABLE MEDIUM

CROSS-REFERENCE TO RELATED APPLICATIONS

The present application claims priority from Japanese Patent Application No. 2016-059769 filed on Mar. 24, 2016, the entire contents of which are hereby incorporated by reference.

BACKGROUND

The technology relates to a technique of determining surveillance positions for an aircraft that surveys a predetermined surveillance target region.

An aircraft such as, but not limited to, a helicopter having task of surveillance is required to quickly change surveillance positions in accordance with circumstances that vary moment to moment.

Highly advanced judgment is requested for setting the surveillance position. In addition, failure to properly set the surveillance position may have a large influence on execution of the task. Despite the possible large influence on the execution of the task, the setting of the surveillance position has been supposed to be judged by a pilot on a basis of experience and instinct of the pilot, resulting in a considerable load on the pilot.

SUMMARY

With regard to this kind of technique, techniques have been proposed as disclosed in Japanese Patent No. 4302625 and Japanese Unexamined Patent Application Publication (Translation of PCT Application) (JP-T) No. 2005-528280, for example. In the techniques, for example, a captured image is analyzed to acquire terrain information on a surveillance target district. However, a technique that makes it possible to set a proper surveillance position has not been proposed.

It is desirable to determine a proper surveillance position for an aircraft that performs surveillance.

An aspect of the technology provides a surveillance position determining apparatus. The surveillance position determining apparatus includes a memory, a cell divider, a score determiner, and a surveillance position setter. The memory stores map information including at least a predetermined surveillance target region. The cell divider divides the map information stored in the memory into multiple cells in a grid on a horizontal plane. The score determiner determines scores for respective candidate cells among the multiple cells. The scores are each based on easiness of viewing from an own aircraft and difficulty of being viewed from a surveillance target that are quantified. The candidate cells exclude multiple surveillance target cells included at least in the surveillance target region. The surveillance position setter sets surveillance positions on a basis of the respective scores of the candidate cells determined by the score determiner.

The score determiner may determine respective scores of the candidate cells for each of the surveillance target cells, and may determine total scores for the respective candidate cells. The total scores may be each sum of the scores of the corresponding one of the candidate cells. The surveillance position setter may set the surveillance positions on a basis of the respective total scores of the candidate cells.

A judging unit may be further provided that may judge whether all of the surveillance target cells are surveyable from a first surveillance position of the surveillance positions set by the surveillance position setter. The score determiner may determine the total scores of the candidate cells for a second surveillance target cell excluding the surveillance target cells that are surveyable from the first surveillance position, among all of the surveillance target cells, when the judging unit judges that not all of the surveillance target cells are surveyable from the first surveillance position. The surveillance position setter may set a second surveillance position from which the second surveillance target cell is surveyable on a basis of the total scores of the candidate cells for the second surveillance target cell.

The score determiner may set, among the multiple cells, the cells that are included in an inside of a circle having a radius of a surveillance maximum distance around a single surveillance target cell and are not included in a surveillance prohibited region including the surveillance target region, as the candidate cells for the single surveillance target cell.

The memory may store, in advance, an evaluation table that quantitatively evaluates suitability of the respective candidate cells as the surveillance positions. The score determiner may determine the respective scores of the candidate cells on a basis of the evaluation table stored in the memory.

The score determiner may determine, as the score quantified on a basis of the easiness of viewing from the own aircraft, scores based on a peripheral viewing angle and a dip of the aircraft, and a score based on a degree of clearness of a land, on a basis of the evaluation table stored in the memory. The score determiner may determine, as the score quantified on a basis of the difficulty of being viewed from the surveillance target, a score based on a background at a time when the aircraft is visually recognized by the surveillance target and a score based on a horizontal distance from each of the candidate cells to each of the surveillance target cells, on a basis of the evaluation table stored in the memory.

Another aspect of the technology provides a surveillance position determining method. The method includes: dividing map information stored in a memory into multiple cells in a grid on a horizontal plane, the map information including at least a predetermined surveillance target region; determining scores for respective candidate cells, the scores each being based on easiness of viewing from an own aircraft and difficulty of being viewed from a surveillance target that are quantified, and the candidate cells excluding multiple surveillance target cells included at least in the surveillance target region, among the multiple cells; and setting the surveillance positions on a basis of the determined respective scores of the candidate cells.

Another aspect of the technology provides a non-transitory tangible computer readable medium having a program. The program causes, when executed by a computer, the computer to implement a method. The method includes: dividing map information stored in a memory into multiple cells in a grid on a horizontal plane, the map information including at least a predetermined surveillance target region; determining scores for respective candidate cells, the scores each being based on easiness of viewing from an own aircraft and difficulty of being viewed from a surveillance target that are quantified, and the candidate cells excluding a plurality of surveillance target cells included at least in the surveillance target region, among the plurality of cells; and setting the surveillance positions on a basis of the determined respective scores of the candidate cells.

Another aspect of the technology provides a surveillance position determining apparatus. The surveillance position determining apparatus includes a memory and circuitry. The memory stores map information including at least a predetermined surveillance target region. The circuitry divides the map information stored in the memory into multiple cells in a grid on a horizontal plane. The circuitry determines scores for respective candidate cells among the multiple cells. The scores are each based on easiness of viewing from an own aircraft and difficulty of being viewed from a surveillance target that are quantified. The candidate cells exclude multiple surveillance target cells included at least in the surveillance target region. The circuitry sets surveillance positions on a basis of the respective determined scores of the candidate cells.

BRIEF DESCRIPTION OF THE DRAWINGS

FIG. 2A illustrates an example of a first evaluation table.

FIG. 2B illustrates an example of a second evaluation table.

FIG. 2C illustrates an example of a third evaluation table.

FIG. 3A illustrates an example of a fourth evaluation table.

FIG. 3B illustrates an example of a fifth evaluation table.

FIG. 3C illustrates an example of a sixth evaluation table.

DETAILED DESCRIPTION

A description is given below, with reference to the accompanying drawings, of some implementations in which a surveillance position determining apparatus according to an implementation of the technology is applied to an aircraft 10.

[Configuration]

First, a configuration of the aircraft 10 according to an implementation is described.

Figure 1:
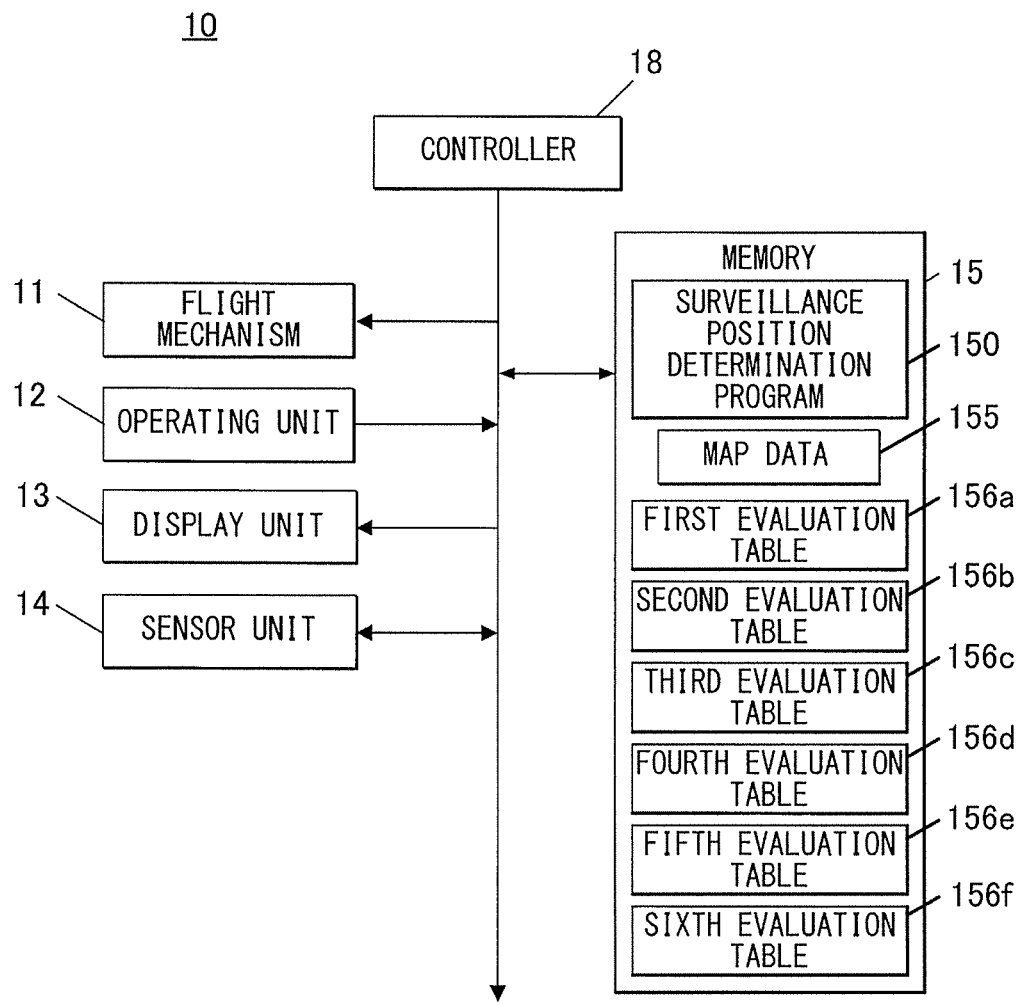
FIG. 1 is a block diagram illustrating an example of an outline configuration of an aircraft according to an implementation of the technology.

FIG. 1 is a block diagram illustrating an example of an outline configuration of the aircraft 10.

Figure 5A:
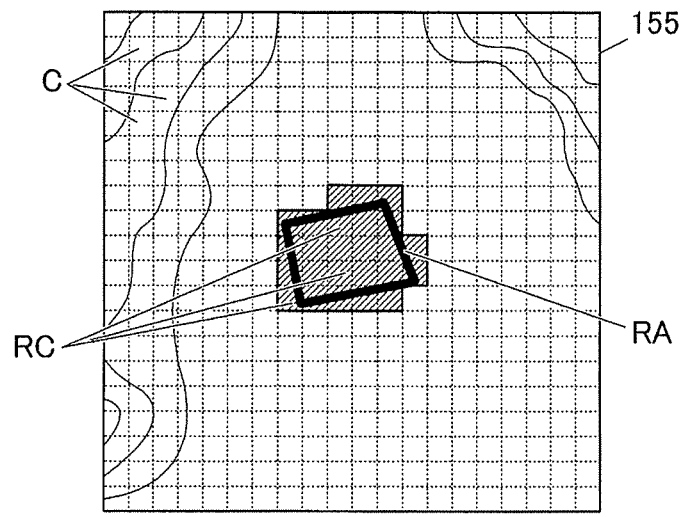
FIGS. 5A to 5C describe the surveillance position determination process.
Figure 5B:
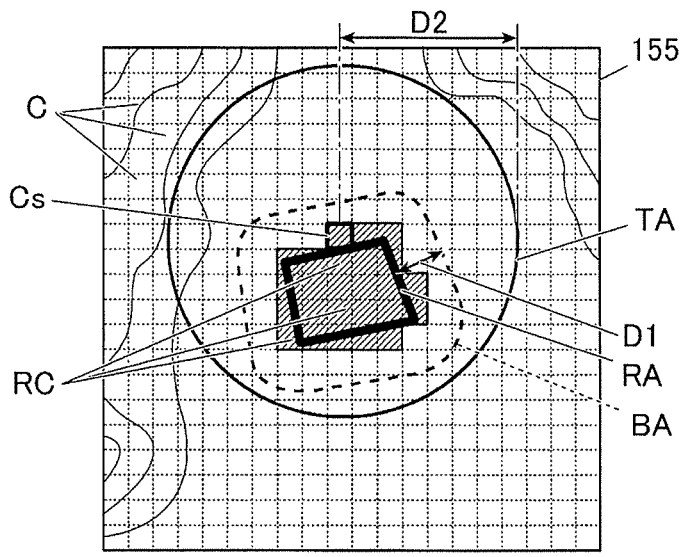
Figure 5C:
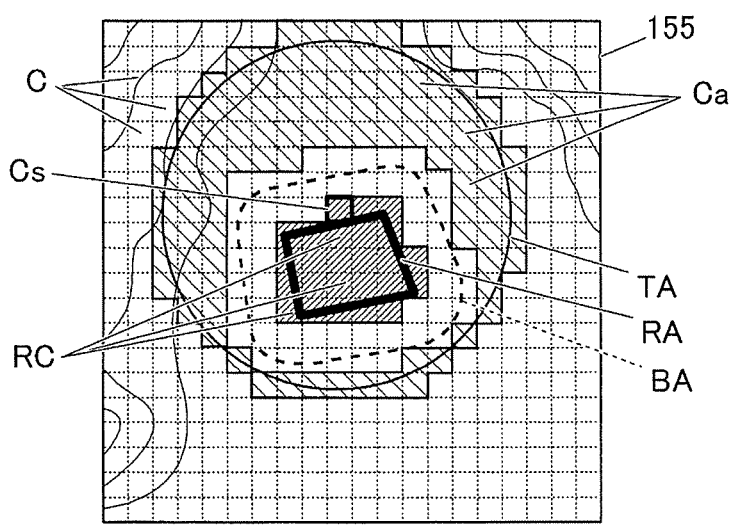

The aircraft 10 may be a rotorcraft in the present implementation. The aircraft 10 may be a helicopter in one implementation. The aircraft 10 may assume a task of performing surveillance or searching of a predetermined surveillance target region RA, as illustrated in FIGS. 5A, 5B, and 5C, for example.

More specifically, the aircraft 10 may include components such as a flight mechanism 11, an operating unit 12, a display unit 13, a sensor unit 14, a memory 15, and a controller 18, as illustrated in FIG. 1.

The flight mechanism 11 may allow the aircraft 10 to fly. The flight mechanism 11 may include, as main components, a rotary wing that generates lift necessary for flight, and an internal combustion engine that generates propulsion. In one implementation, for example, the rotary wing may be a main rotor, and the internal combustion engine may be a jet engine.

The operating unit 12 may be provided, for example, with a control stick and various operation keys, and may supply, to the controller 18, signals corresponding to the states of operations of the control stick and the various operation keys.

The display unit 13 may include an unillustrated display, and may display various pieces of information on the display on the basis of display signals supplied from the controller 18.

The sensor unit 14 may be provided with various sensors including a search sensor, and may acquire, using the various sensors, various pieces of information such as presence of a surveillance target (or a search target) and a position of the surveillance target as well as an own position (such as longitude, latitude, and altitude) of the aircraft 10.

It is to be noted that, in the following description, acquisition of the surveillance target with the search sensor is also referred to by the description of "visual recognition" unless otherwise stated.

The memory 15 may store a program or data that are used to achieve various functions of the aircraft 10. The memory 15 may also serve as a workspace. The memory 15 may store, for example, a surveillance position determination program 150, map data 155, a first evaluation table 156a, a second evaluation table 156b, a third evaluation table 156c, a fourth evaluation table 156d, a fifth evaluation table 156e, and a sixth evaluation table 156f in the present implementation.

Figure 4:
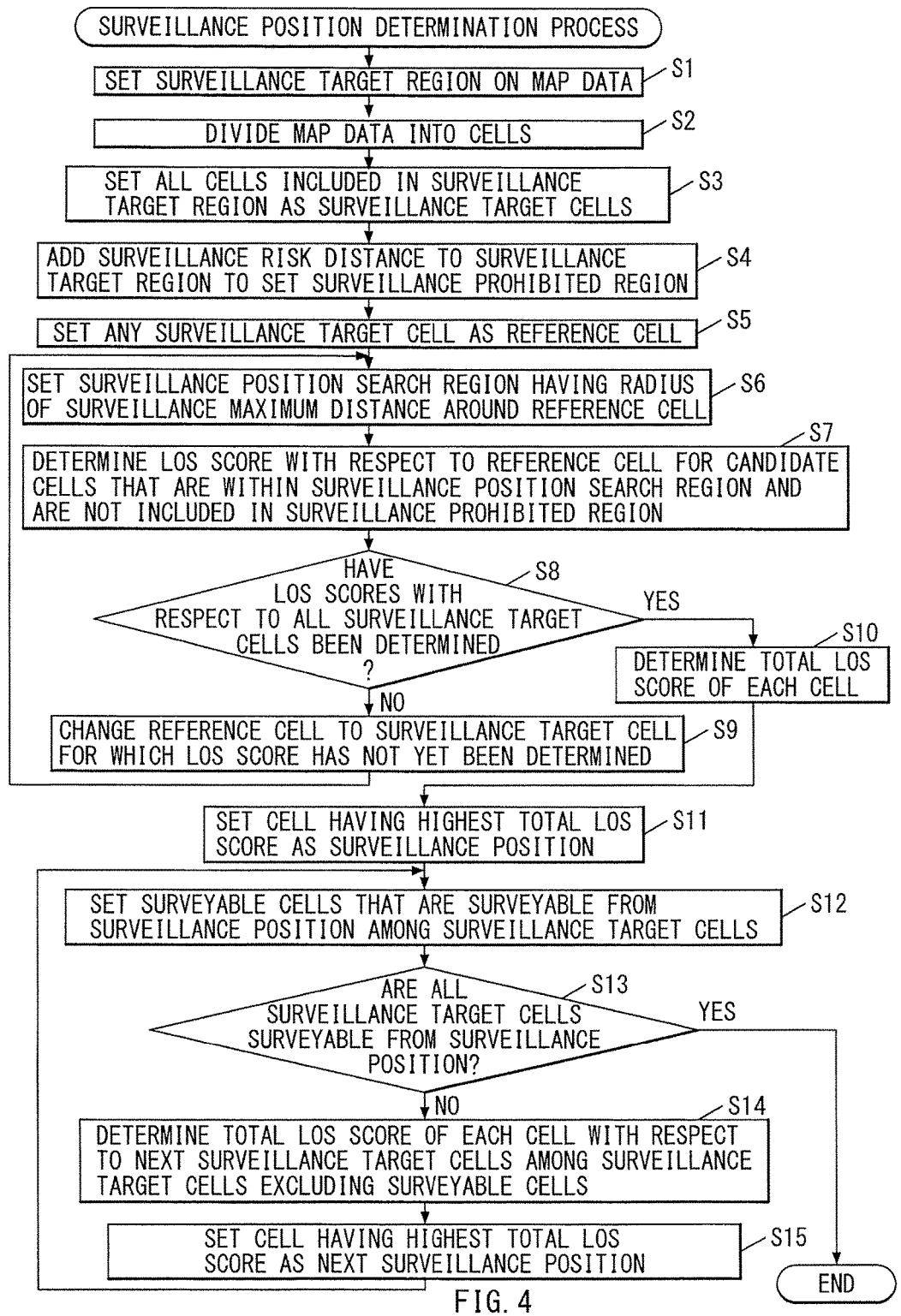
FIG. 4 is a flowchart of a flow of a surveillance position determination process.

The surveillance position determination program 150 may cause the controller 18 to execute a surveillance position determination process as described later, as illustrated in FIG. 4.

The map data 155 may include comprehensive geographic information including terrain information and information on a utilization state of the land. Examples of the terrain information may include information on a mountain and a river. Examples of the information on the utilization state of the land may include information on a road, a railway, a building, and a farm. The map data 155 may be sufficient as long as the map data 155 includes a range of a region related to the task. In other words, the map data 155 may be sufficient as long as the map data 155 includes the surveillance target region RA as described later and a predetermined range surrounding the surveillance target region RA.

The first evaluation table 156a, the second evaluation table 156b, the third evaluation table 156c, the fourth evaluation table 156d, the fifth evaluation table 156e, and the sixth evaluation table 156f may be used upon quantitative evaluation of suitability of each point (a cell C as described later) as a surveillance position SP in the surveillance position determination process, as described later.

Among the above-mentioned tables, the first evaluation table 156a, the second evaluation table 156b, and the third evaluation table 156c may be used for evaluating easiness of viewing from the own aircraft (easiness of surveillance). The fourth evaluation table 156d, the fifth evaluation table 156e, and the sixth evaluation table 156f may be used for evaluating difficulty of being viewed from the surveillance target (difficulty of the own aircraft being found).

Among the tables, the first evaluation table 156a may be used to determine "field of view (FOV) suitability value". As illustrated in FIG. 2A, the first evaluation table 156a may associate a peripheral viewing angle of the aircraft 10 (a pilot) at a time of visual recognition with a score (or a point) for the peripheral viewing angle. The peripheral viewing angle of the aircraft 10 is a peripheral viewing angle at a time when the aircraft 10 visually recognizes surveillance target cells RC (see, e.g., FIGS. 5A, 5B, and 5C) from a relevant cell C. The relevant cell C may be a candidate cell Ca as described later.

The second evaluation table 156b may determine a "dip suitability value" as described later. As illustrated in FIG. 2B, the second evaluation table 156b may associate a dip of an aircraft body at a time of visual recognition with a score (or a point) for the dip of the aircraft body. The dip of the aircraft body is a dip of the aircraft body at a time when the aircraft 10 visually recognizes the surveillance target cells RC from the relevant cell C.

The third evaluation table 156c may determine a "terrain suitability value" as described later. As illustrated in FIG. 2C, the third evaluation table 156c may associate a terrain of the relevant cell C with a score (or a point) for the terrain. The relevant cell C may be a reference cell Cs as described later.

The fourth evaluation table 156d may determine a "background suitability value" as described later. As illustrated in FIG. 3A, the fourth evaluation table 156d may associate presence or absence of a background at a time of visual recognition with a score (or a point) for the background. The presence or absence of the background is presence or absence at a time when the aircraft 10 located at the relevant cell C is visually recognized from the surveillance target cells RC.

The fifth evaluation table 156e may determine a "distance suitability value A" as described later. As illustrated in FIG. 3B, the fifth evaluation table 156e may associate a horizontal distance L from the relevant cell C to each of the surveillance target cells RC with a score (or a point) for the horizontal distance L.

The sixth evaluation table 156f may determine a "distance suitability value B" as described later. As illustrated in FIG. 3C, the sixth evaluation table 156f may associate a horizontal distance L from the relevant cell C to each of the surveillance target cells RC with a score (or a point) for the horizontal distance L.

It is to be noted that the contents of the first evaluation table 156a to the sixth evaluation table 156f illustrated in FIGS. 2A to 2C and 3A to 3C are mere examples, and the numerical values and other contents of the tables are not limited to those illustrated in FIGS. 2A to 2C and 3A to 3C.

As illustrated in FIG. 1, the controller 18 may perform a central control of each unit included in the aircraft 10. More specifically, on the basis of an operation of the pilot for the operating unit 12, the controller 18 may perform a control of operations of units such as the flight mechanism 11, and may load a designated program out of the programs stored in the memory 15 to thereby execute the various processes on the basis of the loaded program.

[Operation]

A description is now given of an operation of the aircraft 10 performed upon execution of the surveillance position determination process, with reference to FIGS. 4 to 8B.

FIG. 4 is a flowchart of a flow of the surveillance position determination process, and FIGS. 5A to 8B describe the surveillance position determination process.

The surveillance position determination process may determine and set an optimum surveillance position SP for the aircraft 10 that surveys the surveillance target region RA. The controller 18 may read and load the surveillance position determination program 150 stored in the memory 15, and thereby execute the surveillance position determination process, upon reception of instructions to execute the surveillance position determination process through the operation of the pilot, for example.

It is to be noted that, in the present implementation, a hindrance is assumed to be present in the surveillance target region RA, and that the hindrance in the surveillance target region RA is assumed to be a surveillance target (or a search target).

As illustrated in FIG. 4, when the surveillance position determination process is executed, the controller 18 may first set the surveillance target region RA on the map data 155 (step S1).

More specifically, the controller 18 may set the surveillance target region RA on the map data 155 read from the memory 15 on the basis of position information of the surveillance target region RA inputted by, for example, an operation of the pilot, as illustrated in FIG. 5A.

Next, the controller 18 may divide the map data 155 including the surveillance target region RA and a predetermined range surrounding the surveillance target region RA into multiple cells C in a grid on a horizontal plane (step S2). In this example, the controller 18 may generate the cells C each having four sides of a length of 50 m by respective parting lines in a north-south direction and in an east-west direction, for example.

Thereafter, the controller 18 may extract all of the cells C at least a part of which is included in the surveillance target region RA, from the cells C on the map data 155 to set all of the extracted cells C as the surveillance target cells RC (step S3).

Next, the controller 18 may set, as a surveillance prohibited region BA, a range provided with a surveillance risk distance D1 around the entire circumference of the surveillance target region RA as illustrated in FIG. 5B (step S4). In the surveillance prohibited region BA, no surveillance position SP is allowed to be set. In other words, the controller 18 may set the surveillance prohibited region BA that includes the surveillance target region RA.

As used herein, the surveillance risk distance D1 may refer to a range where it is difficult for a surveillance action to be performed around the surveillance target region RA. Examples of the range where the surveillance action is difficult may include an influence range of the hindrance that is possibly present in the surveillance target region RA and a range where an action of another aircraft to remove the hindrance is predicted.

Although not illustrated, when it is possible to confirm presence of another region where the surveillance action is difficult other than the above-mentioned surveillance prohibited region BA on the basis of, for example, information on the hindrance, such another region may also be added to the surveillance prohibited region BA.

Next, the controller 18 may select any cell among the surveillance target cells RC to set the selected cell as the reference cell Cs (step S5).

Next, the controller 18 may set, as a surveillance position search region TA, an inside of a circle having a radius of a surveillance maximum distance D2 around the reference cell Cs (step S6).

As used herein, the surveillance maximum distance D2 refers to a maximum distance in which a search is possible with a search sensor. When performing surveillance by visual observation, the surveillance maximum distance D2 refers to a maximum distance in which visual recognition is possible by visual observation.

Next, the controller 18 may set, as the candidate cell Ca, each of the cells C that are included in an inside of the surveillance position search region TA and are not included in the surveillance prohibited region BA. The controller 18 may set, as the candidate cell Ca, each of the cells C that are not included in the surveillance prohibited region BA, for example, among the cells C at least a part of which is included in the surveillance position search region TA. It is to be noted that the controller 18 may set, as the candidate cell Ca, each of the cells C that are not included in the surveillance prohibited region BA, for example, among the cells C an entire part of which is included in the surveillance position search region TA. Next, the controller 18 may determine respective scores of the candidate cells Ca on the basis of the first evaluation table 156a to the sixth evaluation table 156f. More specifically, the controller 18 may determine a line of sight (LOS) score P with respect to the reference cell Cs, for all of the candidate cells Ca, for example, as illustrated in FIG. 5C (step S7).

The LOS score P may be a score obtained by quantitatively evaluating suitability of the candidate cell Ca as the surveillance position SP from the viewpoints of "easiness of viewing from an own aircraft" and "difficulty of being viewed from a surveillance target" in a case of performing surveillance of the reference cell Cs from a certain candidate cell Ca. Higher LOS score P corresponds to higher suitability as the surveillance position SP. The controller 18 may determine, as the score quantified on a basis of the "easiness of viewing from the own aircraft", scores based on a peripheral viewing angle and a dip of the aircraft 10, and a score based on a degree of clearness of a land, on the basis of the first evaluation table 156a to the third evaluation table 156c. The controller 18 may determine, as the score quantified on a basis of the "difficulty of being viewed from the surveillance target", a score based on a background at a time when the aircraft 10 is visually recognized by the surveillance target and a score based on a horizontal distance from each of the candidate cells Ca to each of the surveillance target cells RC, on the basis of the fourth evaluation table 156d to the sixth evaluation table 156f.

More specifically, in this step S7, the controller 18 may determine the LOS score P of each of the candidate cells Ca with respect to the reference cell Cs, using the following Expression (1):

$$P = P1 + P2 \quad (1)$$

As used herein, the value P1 may be a value obtained by quantifying the suitability related to the "easiness of viewing (or surveying) from an own aircraft" for the candidate cell Ca, the LOS score P of which is to be determined, and may be determined using the following Expression (2):

$$P1 = a \times (\text{FOV suitability value}) + b \times (\text{dip suitability value}) + c \times (\text{terrain suitability value}) \quad (2)$$

where "a" to "c" each denote a predetermined coefficient in the right side of Expression (2).

The "field of view (FOV) suitability value" may be a score based on a peripheral viewing angle of the aircraft 10 (pilot) at a time when the aircraft 10 at the relevant candidate cell Ca visually recognizes the reference cell Cs (a surveillance target included in the reference cell Cs). The "FOV suitability value" may be so determined as to be a higher score as a wider peripheral viewing angle is able to be secured (or as a surrounding terrain is clearer) in the relevant candidate cell Ca, on the basis of the map data 155 and the first evaluation table 156a (see FIG. 2A).

The "dip suitability value" may be a score based on a dip of the aircraft body at a time when the aircraft 10 visually recognizes the reference cell Cs (a surveillance target included in the reference cell Cs) at the relevant candidate cell Ca. To obtain the "dip suitability value", altitude at a time when the aircraft 10 at the candidate cell Ca is able to visually recognize the reference cell Cs (a surveillance target included in the reference cell Cs) and a dip of the aircraft body at this time may be first determined on the basis of the map data 155. Thereafter, on the basis of the second evaluation table 156b (see FIG. 2B), the "dip suitability value" may be so determined as to be the highest score when the dip is within a dip limit value; when the dip is outside the dip limit value, the "dip suitability value" may be so determined as to be a higher score as a difference in altitude with respect to the dip limit value range is smaller. In this example, the dip limit value may be a value determined by performances such as the aircraft performance and the performance of the sensor of the aircraft 10.

The "terrain suitability value" may indicate easiness of viewing the reference cell Cs from the circumference, and may be a score based on a degree of clearness of a land of the terrain of the reference cell Cs as a score. The "terrain suitability value" may be so determined as to be a higher score as the terrain of the reference cell Cs is a clearer land, and may be so determined as to be a lower score as the terrain of the reference cell Cs is a land full of blocking objects, on the basis of the map data 155 and the third evaluation table 156c (see FIG. 2C).

In contrast, the value P2 in Expression (1) may be a value obtained by quantifying the suitability related to the "difficulty of being viewed (of an own aircraft being found) from a surveillance target" for the candidate cell Ca to be determined, and may be determined using the following Expression (3):

$$P2 = d \times (\text{background suitability value}) + e \times (\text{distance suitability value } A) + f \times (\text{distance suitability value } B) \quad (3)$$

where "d" to "f" each denote a predetermined coefficient in the right side of Expression (3).

The "background suitability value" may be a score based on a background at a time when the aircraft 10, which visually recognizes the reference cell Cs (a surveillance target included in the reference cell Cs) from the relevant candidate cell Ca, is visually recognized by the surveillance target. The "background suitability value" may be so determined as to be a higher score when a background is present. Non-limiting examples of the background may include a landform such as a mountain surface. The "background suitability value" may be so determined as to be a lower score when a background is absent except the sky on the basis of the fourth evaluation table 156d (see FIG. 3A).

The "distance suitability value A" may be a score based on a horizontal distance from the relevant candidate cell Ca to the reference cell Cs from the viewpoint of the difficulty of being found from the surveillance target. The "distance suitability value A" may be so determined as to be a higher score as the horizontal distance is longer on the basis of the fifth evaluation table 156e (see FIG. 3B).

The "distance suitability value B" may be a score based on a horizontal distance from the relevant candidate cell Ca to the reference cell Cs from the viewpoint of the easiness of avoiding an action from the surveillance target. The "distance suitability value B" may be so determined as to be a higher score as the horizontal distance is longer on the basis of the sixth evaluation table 156f (see FIG. 3C).

It is to be noted that the LOS score P may preferably include, in addition to those described above, points of traveling direction of the surveillance target, position of the sun, wind direction, and altitude of a cloud base, for example.

Next, the controller 18 may judge whether the LOS score P has been determined with respect to all of the surveillance target cells RC using each of the surveillance target cells RC as the reference cell Cs (step S8).

In this step S8, when it is judged that the LOS score P has not been determined with respect to all of the surveillance target cells RC (step S8; NO), the controller 18 may change the reference cell Cs to any cell Cs of the surveillance target cells RC which have not yet been set as the reference cell Cs (step S9), and the flow may move to the process of the above-described step S6.

Figure 6A:
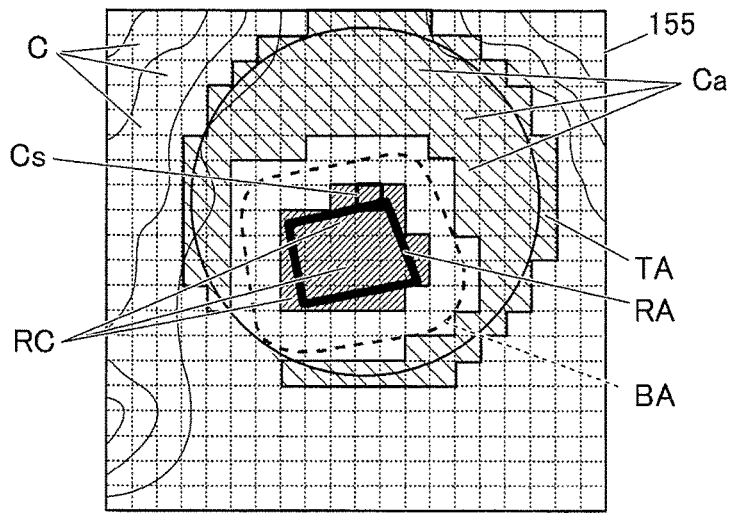
FIGS. 6A to 6C describe the surveillance position determination process.

Thus, for example, the surveillance target cell RC, which is adjacent to the reference cell Cs for which the LOS score P has been determined previously, may be set as the new reference cell Cs. The surveillance position search region TA may be set for the new reference cell Cs to determine the LOS score P as illustrated in FIG. 6A.

Further, in step S8, when it is judged that the LOS score P has been determined with respect to all of the surveillance target cells RC (step S8; YES), the controller 18 may determine a total LOS score of each of the cells C (step S10).

More specifically, the controller 18 may determine the total LOS score for all of the cells C each having been set as the candidate cell Ca at least once. The total LOS score may be the sum of the LOS scores P as determined with respect to the respective surveillance target cells RC each being set as the reference cell Cs.

Figure 6B:
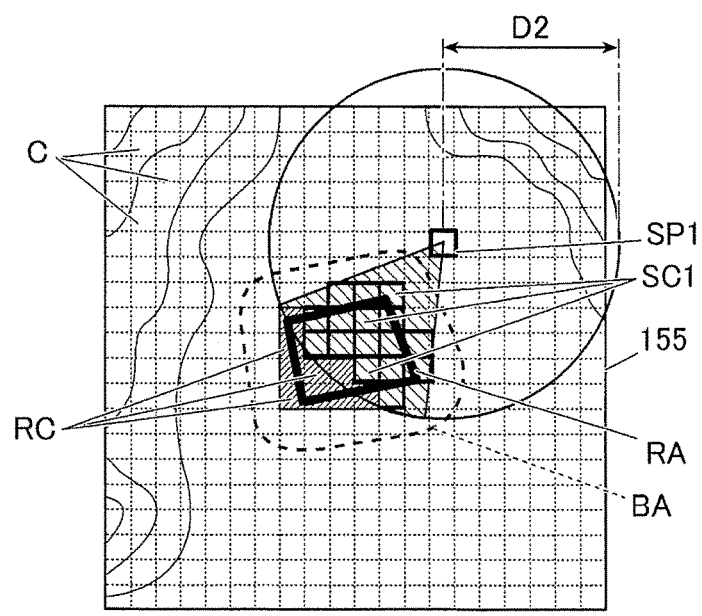

Next, the controller 18 may set a first surveillance position SP1 on the basis of respective determined scores of the candidate cells Ca. For example, the respective scores may be the total LOS score. More specifically, the controller 18, for example, may set a cell C having the highest total LOS score as the first surveillance position SP1 as illustrated in FIG. 6B (step S11).

Thereafter, the controller 18 may extract surveillance target cells RC that are surveyable (or surveillance target cells RC that allows for acquisition of the LOS score P) from the first surveillance position SP1 among all of the surveillance target cells RC, and may set the extracted surveillance target cells RC as first surveyable cells SC1 (step S12).

Figure 6C:
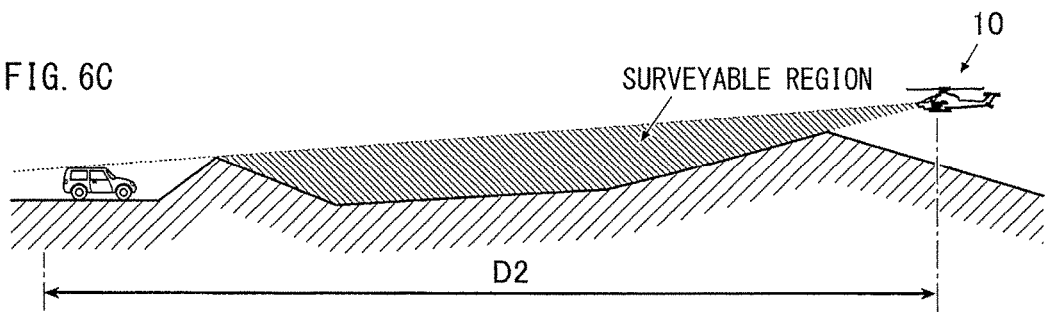

As used herein, the term "surveyable" may refer to that an object is visually recognizable without being blocked by terrain, for example, within a range of the surveillance maximum distance D2 as illustrated in FIG. 6C, and the hatched portion in the drawing corresponds to the range of the surveillance maximum distance D2.

Next, the controller 18 may judge whether it is possible to survey all of the surveillance target cells RC from the first surveillance position SP1 (step S13). In other words, in this step S13, the controller 18 may judge whether the first surveyable cells SC1 are equivalent to the surveillance target cells RC.

In this step S13, when it is judged that it is possible to survey all of the surveillance target cells RC from the first surveillance position SP1 (step S13; YES), the controller 18 may set the first surveillance position SP1 as the surveillance position SP to terminate the surveillance position determination process.

It is to be noted that, in step S13, a configuration may also be adopted in which the number of the search for the surveillance position (i.e., the number of determination in step S13) is also determined together. When the number of the search for the surveillance position reaches a predetermined number that is set in advance, the surveillance position determination process may also be terminated regardless of whether it is possible to survey all of the surveillance target cells RC from the first surveillance position SP1.

Figure 7A:
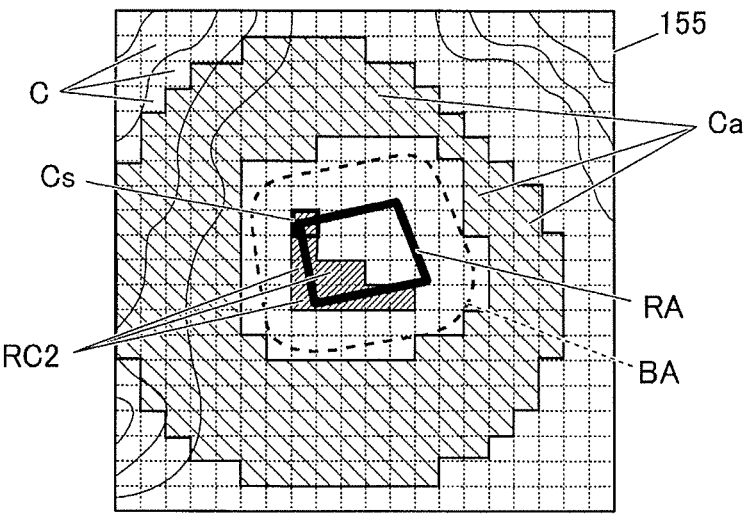
FIGS. 7A to 7C describe the surveillance position determination process.

In step S13, when it is judged that it is not possible to survey all of the surveillance target cells RC from the first surveillance position SP1 (step S13; NO), the controller 18 may set, as second surveillance target cells RC2, surveillance target cells RC among all of the surveillance target cells RC excluding the first surveyable cells SC1, and may determine a total LOS score of each of the cells C with respect to the second surveillance target cells RC2, as illustrated in FIG. 7A (step S14).

More specifically, the controller 18 may determine the total LOS score for all of the cells C each having been set as the candidate cell Ca at least once. The total LOS score may be the sum of the LOS scores P (which have been already determined in the above-described step S7) as determined with respect to the respective second surveillance target cells RC2 each being set as the reference cell Cs. It is to be noted that FIG. 7A illustrates the candidate cells Ca not only for the reference cell Cs set in the drawing but also for all of the second surveillance target cells RC2.

Figure 7B:
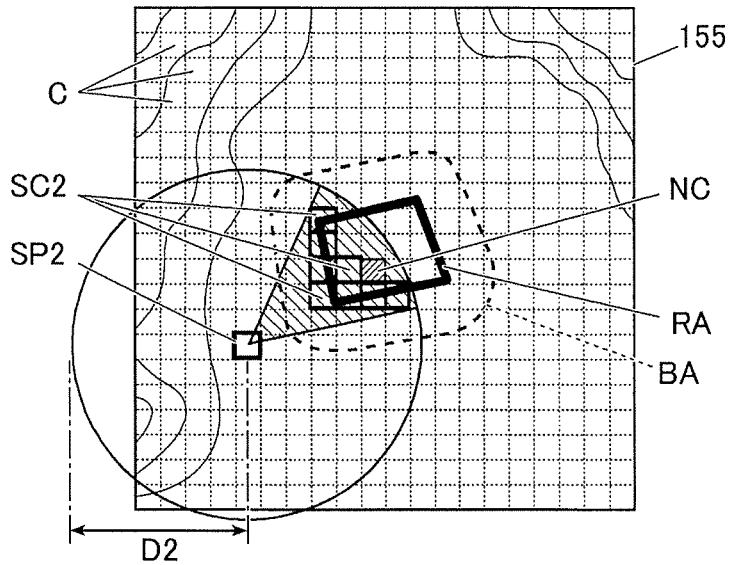

Next, the controller 18 may set, as a second surveillance position SP2, a cell C having the highest total LOS score that has been determined in step S14 as illustrated in FIG. 7B (step S15), and the flow may move to the process of the above-described step S12. However, after the move to step S12, the flow may be sequentially processed by replacing the surveillance position and the surveillance target cells with those having been set immediately before.

In other words, in the subsequent step S12, the controller 18 may extract second surveillance target cells RC2, which are surveyable from the second surveillance position SP2, among the second surveillance target cells RC2, and may set the extracted second surveillance target cells RC2 as second surveyable cells SC2. Thereafter, the controller 18 may judge whether all of the second surveillance target cells RC2 are surveyable from the second surveillance position SP2 (step S13), and may terminate the process when it is judged that all of the second surveillance target cells RC2 are surveyable from the second surveillance position SP2. When it is judged that not all of the second surveillance target cells RC2 are surveyable from the second surveillance position SP2, the controller 18 may set third surveillance target cells similarly to the cases of the above-described steps S14 and S15, and may determine a total LOS score of each of the cells C with respect to the third surveillance target cells to set a third surveillance position on the basis of the determined total LOS score.

Figure 7C:
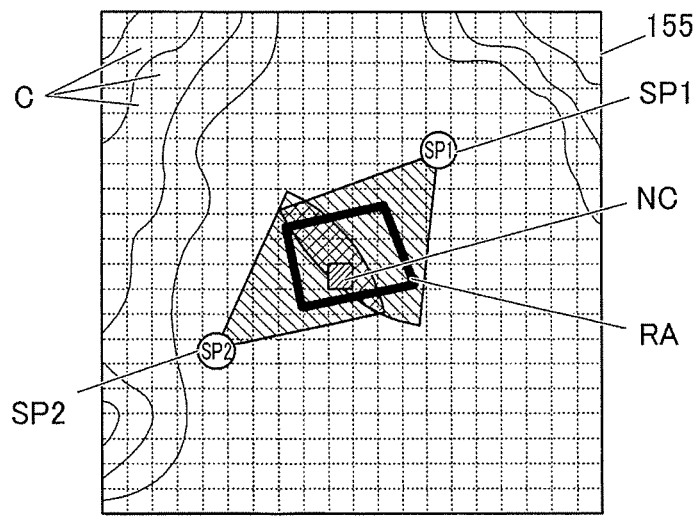

In the present implementation, a surveillance target cell RC, among the surveillance target cells RC, which is unsurveyable from any of the first surveillance position SP1 and the second surveillance position SP2 may be a cell C (unsurveyable cell NC) that is unsurveyable from anywhere due to geographical blocking, as illustrated in FIG. 7C. Therefore, search for the third surveillance position and afterwards may be performed, but it is not possible to set a surveillance position that allows for surveillance of the unsurveyable cell NC. When the number of the search for the surveillance position (the number of determination in step S13) reaches a predetermined number, the surveillance position determination process may be terminated.

Figure 8A:
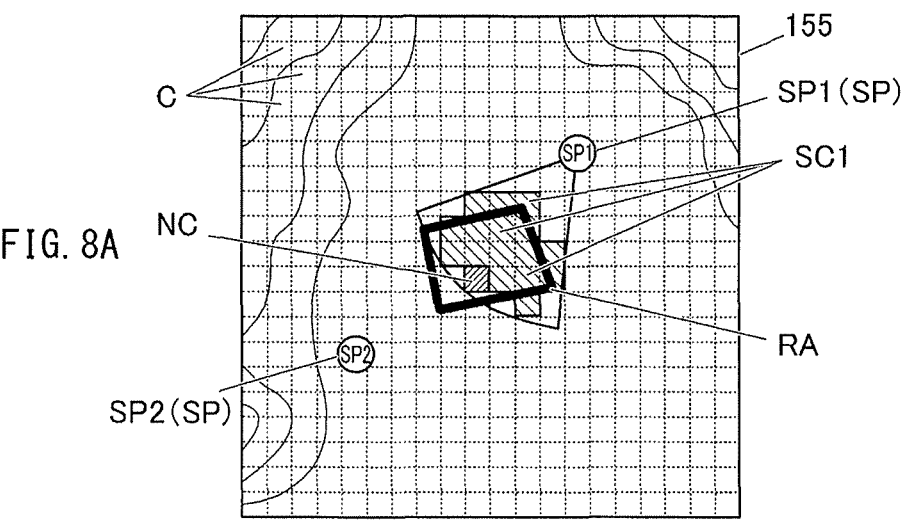
FIGS. 8A and 8B describe the surveillance position determination process.
Figure 8B:
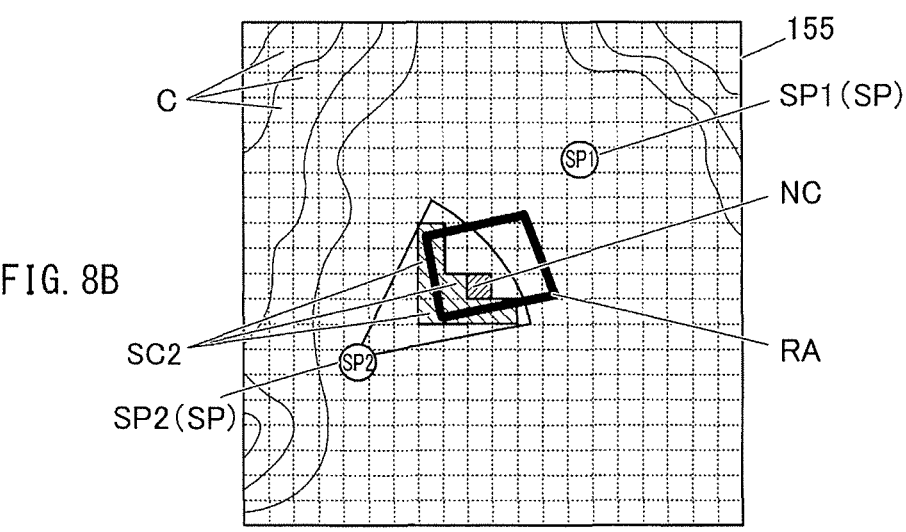

Thus, two surveillance positions SP, i.e., the first surveillance position SP1 suitable for surveillance of the first surveyable cells SC1 and the second surveillance position SP2 suitable for surveillance of the second surveyable cells SC2 may be set among the surveillance target cells RC, as illustrated in FIGS. 8A and 8B.

[Effects]

As described above, according to the present implementation, the LOS score P may be determined for the respective candidate cells Ca, among the cells C excluding the surveillance target cells RC included at least in the surveillance target region RA. Thereafter, the surveillance position SP may be set on the basis of the LOS score P. The LOS score P may be determined through quantification on the basis of the easiness of viewing from the own aircraft and the difficulty of being viewed from the surveillance target. The map data 155 may be divided into the cells C on the horizontal plane.

This makes it possible to set the surveillance position SP by quantitatively evaluating suitability of each point (cell C) as the surveillance position SP from the viewpoints of the easiness of viewing from the own aircraft and the difficulty of being viewed from the surveillance target, unlike the selection of a surveillance position which has been performed on the basis of experience and instinct of the pilot.

Therefore, it is possible to determine a proper surveillance position SP without depending on the experience and instinct of the pilot. Moreover, it is possible to determine the proper surveillance position SP instantaneously even under imminent circumstances, thus enhancing certainty in achieving a task.

[Modifications]

It is to be noted that the technology is not limitedly applicable to the foregoing implementations. It should be appreciated that modifications and alterations may be made by persons skilled in the art without departing from the scope as defined by the appended claims.

For example, the implementation has been described above in which the surveillance position determination process is terminated when all of the surveillance target cells RC are surveyable from the set surveillance position SP. However, the process may also be terminated when the number of the surveillance position SP being set reaches a number having been inputted in advance. This modification example may be effective, for example, when surveillance positions SP are intended to be set so as to correspond to the number of aircrafts that perform surveillance.

Further, when the values of the total LOS scores of all of the cells C are lower than a predetermined threshold value, the surveillance position determination process may also be terminated as there is no point that allows for surveillance.

Moreover, the implementation has been described above in which the surveillance position determining apparatus according to an implementation of the technology is applied to (or mounted on) the aircraft 10. However, the surveillance position determining apparatus may also be provided, for example, in a ground facility that is able to communicate with an aircraft.

The invention claimed is:

1. A surveillance position determining apparatus comprising:
   a memory that stores a map including at least a surveillance target region;
   a cell divider that divides the map into multiple cells in a grid, the multiple cells including:
      surveillance target cells corresponding to the surveillance target region, the surveillance target cells including a first reference cell and a second reference cell;
      surveillance prohibited cells corresponding to a surveillance prohibited region, the surveillance prohibited region surrounding an entire circumference of the surveillance target region, the surveillance prohibited region extending outward from the surveillance target region for a first distance; and
      candidate cells corresponding to a surveillance position search region, the surveillance position search region being a region within a perimeter that extends from the first reference cell or the second reference cell for a second distance, the region within the perimeter excluding the surveillance target region and the surveillance prohibited region;
   a score determiner that:
      determines, when the perimeter extends from the first reference cell, a first score for a first candidate cell of the candidate cells based on 1) easiness of viewing the first reference cell from an own aircraft when the own aircraft flying over the first candidate cell and 2) difficulty of viewing the own aircraft flying over the first candidate cell from the first reference cell;
      determines, when the perimeter extends from the first reference cell, a second score for a second candidate cell of the candidate cells based on 1) easiness of viewing the first reference cell from the own aircraft when the own aircraft flying over the second candidate cell and 2) difficulty of viewing the own aircraft flying over the second candidate cell from the first reference cell;
      determines, when the perimeter extends from the second reference cell, a third score for the first candidate cell of the candidate cells based on 1) easiness of viewing the second reference cell from an own aircraft when the own aircraft flying over the first candidate cell and 2) difficulty of viewing the own aircraft flying over the first candidate cell from the second reference cell;
      determines, when the perimeter extends from the second reference cell, a fourth score for the second candidate cell of the candidate cells based on 1) easiness of viewing the second reference cell from the own aircraft when the own aircraft flying over the second candidate cell and 2) difficulty of viewing the own aircraft flying over the second candidate cell from the second reference cell;
      determines a first total score for the first candidate cell based on the first score and the third score; and
      determines a second total score for the second candidate cell based on the second score and the fourth score; and
   a surveillance position setter that sets the first candidate cell as a first surveillance position based on determining that the first total score is higher than the second total score.

2. The surveillance position determining apparatus according to claim 1, wherein
   the first total score is a sum of the first score and the third score for the first candidate cell,
   the second total score is a sum of the second score and the fourth score for the second candidate cell,
   the candidate cells includes a third candidate cell, and
   the score determiner:
      determines, when the perimeter extends from the first reference cell, a fifth score for the third candidate cell based on 1) easiness of viewing the first reference cell from the own aircraft when the own aircraft flying over the third candidate cell and 2) difficulty of viewing the own aircraft flying over the third candidate cell from the first reference cell; and determines, when the perimeter extends from the second reference cell, a sixth score for the third candidate cell based on 1) easiness of viewing the second reference cell from the own aircraft when the own aircraft flying over the third candidate cell and 2) difficulty of viewing the own aircraft flying over the third candidate cell from the second reference cell.

3. The surveillance position determining apparatus according to claim 2, further comprising a judging unit that judges whether all of surveillance target cells are surveyable from the first surveillance position, wherein
the surveillance target cells includes a third reference cell, when the first reference cell is surveyable from the first surveillance position and the second reference cell and the third reference cell are-not surveyable from the first surveillance position, the score determiner:
determines, when the perimeter extends from the third reference cell, a seventh score for the second candidate cell based on 1) easiness of viewing the third reference cell from the own aircraft when the own aircraft flying over the second candidate cell and 2) difficulty of viewing the own aircraft flying over the second candidate cell from the third reference cell;
determines, when the perimeter extends from the third reference cell, an eighth score for the third candidate cell based on 1) easiness of viewing the third reference cell from the own aircraft when the own aircraft flying over the third candidate cell and 2) difficulty of viewing the own aircraft flying over the third candidate cell from the third reference cell;
determines a fourth total score for the second candidate cell based on the fourth score and seventh score for the second candidate cell; and
determines a fifth total score for the third candidate cell based on the sixth score and the eighth score for the third candidate cell,
the surveillance position setter sets the third candidate cell as a second surveillance position based on determining that the fifth total score for the third candidate cell is higher than the fourth total score for the second candidate cell, and
the surveillance position setter sets, for the own aircraft, the first candidate cell and the third candidate cell as surveillance positions for the own aircraft to surveil the surveillance target region.

4. The surveillance position determining apparatus according to claim 1, wherein
the memory stores an evaluation table that quantitatively evaluates suitability of the first candidate cell and the second candidate cell for the first surveillance position, and
the score determiner determines the first score and the third score for the first candidate cell and the second score and the fourth score for the second candidate cell according to the evaluation table stored in the memory.

5. The surveillance position determining apparatus according to claim 2, wherein
the memory stores an evaluation table that quantitatively evaluates suitability of the first candidate cell, the second candidate cell, and the third candidate cell for the first surveillance position, and
the score determiner determines the first score and the third score for the first candidate cell, the second score and the fourth score for the second candidate cell, and the fifth score and the sixth score for the third candidate cell according to the evaluation table stored in the memory.

6. The surveillance position determining apparatus according to claim 3, wherein
the memory stores an evaluation table that quantitatively evaluates suitability of respective candidate cells for surveillance positions, and
the score determiner determines respective scores of the candidate cells on a basis of the evaluation table stored in the memory.

7. The surveillance position determining apparatus according to claim 4, wherein,
the easiness of viewing is determined based on a peripheral viewing angle, a dip of the own aircraft, and a degree of clearness of a land, and
the difficulty of viewing is determined based on a background at a time when the own aircraft is visually recognized by the surveillance target and a horizontal distance from each of the candidate cells to each of the surveillance target cells.

8. The surveillance position determining apparatus according to claim 5, wherein,
the easiness of viewing from the own aircraft is determined based on a peripheral viewing angle, a dip of the aircraft, and a degree of clearness of a land, and
the difficulty of viewing is determined based on a background at a time when the own aircraft is visually recognized by the surveillance target and a horizontal distance from each of the candidate cells to each of the surveillance target cells.

9. The surveillance position determining apparatus according to claim 6, wherein,
the easiness of viewing from the own aircraft is determined based on a peripheral viewing angle, a dip of the aircraft, and a degree of clearness of a land, and
the difficulty of viewing is determined based on a background at a time when the own aircraft is visually recognized by the surveillance target and a horizontal distance from each of the candidate cells to each of the surveillance target cells.

10. A surveillance position determining method comprising:
dividing a map stored in a memory into multiple cells in a grid, the map including at least a surveillance target region, the multiple cells including:
surveillance target cells corresponding to the surveillance target region, the surveillance target cells including a first reference cell and a second reference cell;
surveillance prohibited cells corresponding to a surveillance prohibited region, the surveillance prohibited region surrounding an entire circumference of the surveillance target region, the surveillance prohibited region extending outward from the surveillance target region for a first distance; and
candidate cells corresponding to a surveillance position search region, the surveillance position search region being a region within a perimeter that extends from the first reference cell or the second reference cell for a second distance, the region within the perimeter excluding the surveillance target region and the surveillance prohibited region;
determining, when the perimeter extends from the first reference cell, a first score for a first candidate cell of the candidate cells based on 1) easiness of viewing the first reference cell from an own aircraft when the own aircraft flying over the first candidate cell and 2) difficulty of viewing the own aircraft flying over the first candidate cell from the first reference cell;

determining, when the perimeter extends from the first reference cell, a second score for a second candidate cell of the candidate cells based on 1) easiness of viewing the first reference cell from the own aircraft when the own aircraft flying over the second candidate cell and 2) difficulty of viewing the own aircraft flying over the second candidate cell from the first reference cell;

determining, when the perimeter extends from the second reference cell, a third score for the first candidate cell of the candidate cells based on 1) easiness of viewing the second reference cell from the own aircraft when the own aircraft flying over the first candidate cell and 2) difficulty of viewing the own aircraft flying over the first candidate cell from the second reference cell;

determining, when the perimeter extends from the second reference cell, a fourth score for the second candidate cell of the candidate cells based on 1) easiness of viewing the second reference cell from the own aircraft when the own aircraft flying over the second candidate cell and 2) difficulty of viewing the own aircraft flying over the second candidate cell from the second reference cell;

determining a first total score for the first candidate cell based on the first score and the third score;

determining a second total score for the second candidate cell based on the second score and the fourth score; and setting the first candidate cell as a first surveillance position based on determining that the first total score is higher than the second total score.

11. A non-transitory tangible computer readable medium having a program that causes, when executed by a computer, the computer to implement a method, the method comprising:

dividing a map stored in a memory into multiple cells in a grid, the map including at least a surveillance target region, the multiple cells including:
  surveillance target cells corresponding to the surveillance target region, the surveillance target cells including a first reference cell and a second reference cell;
  surveillance prohibited cells corresponding to a surveillance prohibited region, the surveillance prohibited region surrounding an entire circumference of the surveillance target region, the surveillance prohibited region extending outward from the surveillance target region for a first distance; and
  candidate cells corresponding to a surveillance position search region, the surveillance position search region being a region within a perimeter that extends from the first reference cell or the second reference cell for a second distance, the region within the perimeter excluding the surveillance target region and the surveillance prohibited region;

determining, when the perimeter extends from the first reference cell, a first score for a first candidate cell of the candidate cells based on 1) easiness of viewing the first reference cell from an own aircraft when the own aircraft flying over the first candidate cell and 2) difficulty of viewing the own aircraft flying over the first candidate cell from the first reference cell;

determining, when the perimeter extends from the first reference cell, a second score for a second candidate cell of the candidate cells based on 1) easiness of viewing the first reference cell from the own aircraft when the own aircraft flying over the second candidate cell and 2) difficulty of viewing the own aircraft flying over the second candidate cell from the first reference cell;

determining, when the perimeter extends from the second reference cell, a third score for the first candidate cell of the candidate cells based on 1) easiness of viewing the second reference cell from the own aircraft when the own aircraft flying over the first candidate cell and 2) difficulty of viewing the own aircraft flying over the first candidate cell from the second reference cell;

determining, when the perimeter extends from the second reference cell, a fourth score for the second candidate cell of the candidate cells based on 1) easiness of viewing the second reference cell from the own aircraft when the own aircraft flying over the second candidate cell and 2) difficulty of viewing the own aircraft flying over the second candidate cell from the second reference cell;

determining a first total score for the first candidate cell based on the first score and the third score;

determining a second total score for the second candidate cell based on the second score and the fourth score; and setting the first candidate cell as a first surveillance position based on determining that the first total score is higher than the second total score.

12. A surveillance position determining apparatus comprising:

a memory that stores a map including at least a surveillance target region; and circuitry configured to:

divide the map stored in the memory into multiple cells in a grid, the multiple cells including:
  surveillance target cells and candidate cells, the surveillance target cells corresponding to the surveillance target region, the surveillance target cells including a first reference cell and a second reference cell;
  surveillance prohibited cells corresponding to a surveillance prohibited region, the surveillance prohibited region surrounding an entire circumference of the surveillance target region, the surveillance prohibited region extending outward from the surveillance target region for a first distance; and
  candidate cells corresponding to a surveillance position search region, the surveillance position search region being a region within a perimeter that extends from the first reference cell or the second reference cell for a second distance, the region within the perimeter excluding the surveillance target region and the surveillance prohibited region;

determine, when the perimeter extends from the first reference cell, a first score for a first candidate cell of the candidate cells based on 1) easiness of viewing the first reference cell from an own aircraft when the own aircraft flying over the first candidate cell and 2) difficulty of viewing the own aircraft flying over the first candidate cell from the first reference cell;

determine, when the perimeter extends from the first reference cell, a second score for a second candidate cell of the candidate cells based on 1) easiness of viewing the first reference cell from the own aircraft when the own aircraft flying over the second candidate cell and 2) difficulty of viewing the own aircraft flying over the second candidate cell from the first reference cell;

determine, when the perimeter extends from the second reference cell, a third score for the first candidate cell of the candidate cells based on 1) easiness of viewing the second reference cell from the own aircraft when the own aircraft flying over the first candidate cell and 2) difficulty of viewing the own aircraft flying over the first candidate cell from the second reference cell;

determine, when the perimeter extends from the second reference cell, a fourth score for the second candidate cell of the candidate cells based on 1) easiness of viewing the second reference cell from the own aircraft when the own aircraft flying over the second candidate cell and 2) difficulty of viewing the own aircraft flying over the second candidate cell from the second reference cell;

determine a first total score for the first candidate cell based on the first score and the third score;

determine a second total score for the second candidate cell based on the second score and the fourth score; and set the first candidate cell as a first surveillance position based on determining that the first total score is higher than the second total score.

* * * * *